No. 847,455.
PATENTED MAR. 19, 1907.
A. F. BALLARD.
EXPANDING PISTON PACKING.
APPLICATION FILED JULY 6, 1906.
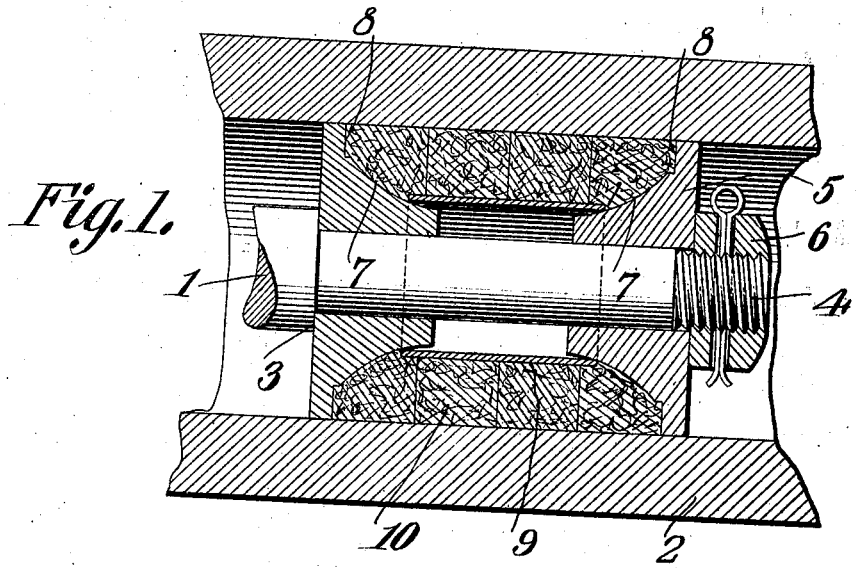
Fig. 1.
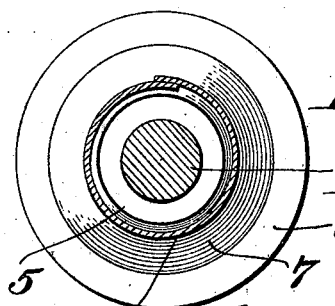
Fig. 4.
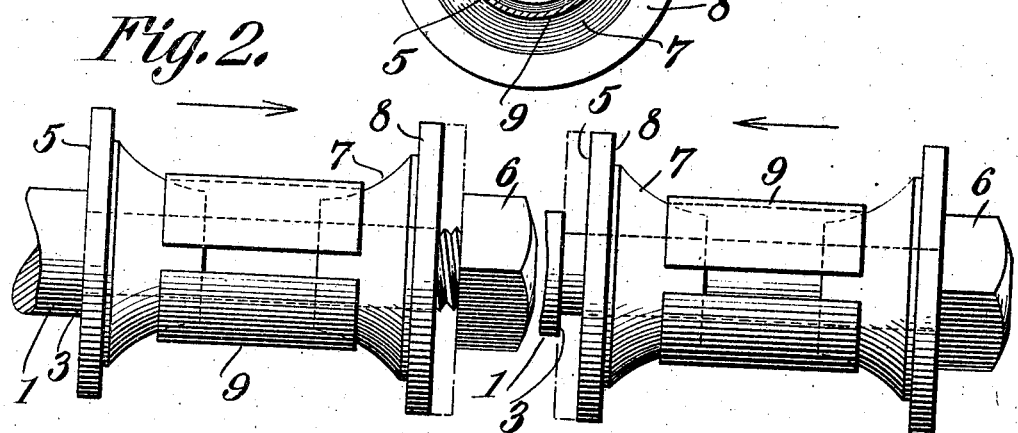
Fig. 2.
Fig. 3.
WITNESSES:
Arthur F. Ballard,
INVENTOR.
By C. A. Snow & Co.
ATTORNEYS.

UNITED STATES PATENT OFFICE.

ARTHUR FARREN BALLARD, OF SEGUNDO, COLORADO.

EXPANDING PISTON-PACKING.

No. 847,455.  Specification of Letters Patent.  Patented March 19, 1907.

Application filed July 6, 1906. Serial No. 325,012.

*To all whom it may concern:*

Be it known that I, ARTHUR FARREN BALLARD, a citizen of the United States, residing at Segundo, in the county of Las Animas and State of Colorado, have invented a new and useful Expanding Piston-Packing, of which the following is a specification.

This invention has relation to expanding piston-packings; and it consists in the novel construction and arrangement of its parts, as hereinafter shown and described.

The object of the invention is to provide a packing especially adapted to be used upon the pistons of pumps.

The packing consists of a pair of oppositely-disposed cone-shaped heads slidably located at the end of the piston-rod. The sliding movement of the said heads is limited by a shoulder provided on the rod and a securing means, such as a tap or enlarged head, provided at the end of the rod. A cylindrical spring surrounds the rod and is interposed between the opposite cone-surfaces of the said heads. About the said spring and between the said heads are located rings, which may be of any desired material, such as fiber, rubber, asbestos, &c.

The prime object of the invention is to provide means for expanding the packing laterally as the piston is performing its work. By so doing the edge of the packing is brought into positive contact with the inner wall of the cylinder and the possibility of leakage about the piston is absolutely prevented. The said piston-heads are adapted to move longitudinally upon the shaft, and in so doing the oppositely-disposed cone-faces expand the spring, which in turn expands the packing and produces the desired effect.

In the accompanying drawing, Figure 1 is a longitudinal sectional view of the expanding-piston. Fig. 2 is a side elevation of the same, showing one head moved away from its abutment. Fig. 3 is a side elevation of the same, showing the other head moved away from its abutment. Fig. 4 is a transverse sectional view of the rod and spring.

The piston-rod 1 is suitably mounted for reciprocation in the cylinder 2. The said rod 1 is provided near its end with the shoulder 3 and at its end is preferably screw-threaded, as at 4. The heads 5 5 are located upon the end of the rod 2, one of said heads normally abutting against the shoulder 3 and the other head normally abutting against the nut 6. The central bore of the said heads 5 5 is sufficiently large in comparison to the diameter of the ends of the rod 1 to permit of sliding with relation to the longitudinal axis of the said rod. The inner faces of the heads 5 5 are provided with the oppositely-disposed cones 7 7. The bases of said cones, however, terminate short of the periphery of the said heads, and the flat annular surfaces 8 extend from the bases of the cones to the periphery of the said heads.

The cylindrical spring 9 is interposed between the heads 5 5 and bears at its ends upon the cone-surfaces 7 7 of the said heads. The said cylindrical spring 9 encircles that portion of the piston-rod 1 which is located between the said heads 5 5. The ends of the spring 9 may overlap, or the spring may be formed so that the ends thereof do not meet each other. When this is the case, the spring is truly circular in cross-section. When the ends overlap, the spring is slightly spiral in cross-section. The spring with overlapping ends is required when soft packing, such as cord or asbestos, is used. The spring with edges that do not quite meet is used when packings of harder material is used. The packing-rings 10 surround the spring 9 and are located between the cone-faces 7 7 of the head 5 5.

From the foregoing description it is obvious that when the piston is moved within the cylinder 2 in one direction and is, for instance, forcing water the piston-head 5, which is subjected to the resistance of the element being operated upon, will move along the rod 1 longitudinally. Such movement is very slight. It is sufficient, however, to cause the conical surfaces 7 of the said piston-heads to approach nearer each other, and the ends of the spring 9 bearing against the said cone-surfaces are opened and the said spring is expanded, which in turn expands the packing-rings 10 and causes the edges of the same to positively engage the inner surfaces of the cylinder and prevent the possibility of leakage of the element being operated upon about the piston. As both of said heads 5 are slidably located, the movement above described occurs at the reciprocation of the rod 1 in either direction. The annular surfaces 8, which are disposed at right angles with the longitudinal axis of the rod 1, cause the end of the packing-rings to pass from the conical surfaces 7 squarely against the inner surfaces of the cylinder 2 and prevents any tendency of the end packing-rings from wedging between the cylinder and the heads 5 5. As the packing-rings wear the spring 9 will expand and follow the same.

Having described my invention, what I claim as new, and desire to secure by Letters Patent, is—

1. A double-acting pressure-piston comprising heads of like contour, packing located between the heads and connecting means for the head upon which the heads are independently slidably mounted for limited movement.

2. A double-acting pressure-piston comprising heads, packing located between the heads and a rod upon which the heads are independently slidably mounted for limited movement.

3. A double-acting pressure-piston comprising conical heads, packing located between the heads and connecting means for the heads upon which the heads are independently slidably mounted for limited movement.

4. A pressure-piston comprising conical heads, a spring bearing at its ends upon the conical surfaces of the heads, packing located around the springs and between the heads and connecting means for the heads upon which the heads are slidably mounted for limited movement.

5. A pressure-piston comprising conical heads, a spring bearing at its ends upon the conical surfaces of the heads and overlapping at its edges, packing located around the spring and between the heads and connecting means for the heads upon which the heads are slidably mounted for limited movement.

In testimony that I claim the foregoing as my own I have hereto affixed my signature in the presence of two witnesses.

ARTHUR FARREN BALLARD.

Witnesses:
W. S. DUNHAM,
JOHN MCKEOWN.